United States Patent [19]
Williams

[11] 3,830,310
[45] Aug. 20, 1974

[54] AERATOR DEVICE
[76] Inventor: Richard R. Williams, Ithaca, Nebr. 68033
[22] Filed: May 11, 1973
[21] Appl. No.: 359,485

[52] U.S. Cl. ............................... 172/22, 294/50.7
[51] Int. Cl. ................................. A01b 45/02
[58] Field of Search ......... 172/22, 21, 41; 294/50.7; 83/588, 684; 30/316, 358, 367; 111/96

[56] References Cited
UNITED STATES PATENTS

| | | | |
|---|---|---|---|
| 2,057,142 | 10/1936 | Fry | 172/22 |
| 2,843,135 | 7/1958 | Lisiewski | 30/316 X |
| 2,855,668 | 10/1958 | Ottenad et al. | 111/92 UX |
| 3,525,546 | 8/1970 | Lowell | 294/50.7 |

Primary Examiner—Stephen C. Pellegrino
Attorney, Agent, or Firm—Henderson & Strom

[57] ABSTRACT

An aerator device for coring or punching holes in a turf surface having a guide tube with an open end and a plugged end, an inner tube slidably mounted in the guide tube, a rod having one end slidably mounted in the inner tube and having a coring tool secured to the other end, a weight disposed in the guide tube plugged end, and a spring interconnecting the rod and inner tube for biasing the rod in a first position, wherein the application of a downward force on the guide tube will cause the rod to slide from a first position to a second position in the inner tube to allow the tool to project outwardly of the inner tube and the spring, upon release of the downward force causes the rod to return to its first position.

9 Claims, 6 Drawing Figures

3,830,310

AERATOR DEVICE

BACKGROUND OF THE INVENTION

This invention relates to turf conditioning equipment, and more particularly to a manually operated tool for punching and removing cores of turf.

The aeration of turf is widely practiced for the purpose of allowing air, water and nutrients to effectively penetrate the turf surface for absorption by the roots of grass, shrubs and trees. The most efficient aeration is accomplished by the removal of small cores of turf material from the turf. These cores should be approximately one half inch in diameter and 2 inches in length. By removing cores, instead of merely punching the surface with a solid tool, an even turf surface is maintained, and the soil surrounding the core hole is not unduly compacted. In fact, it has been found that, if the hole is merely punched, the compacted soil, upon being moistened by rain or the like, merely reexpands to its original shape and reseals the hole. A resealing of the hole merely necessitates the time consuming repetition of reaerating the turf.

A number of automatic aerating devices have been developed wherein a plurality of holes are formed substantially simultaneously. These devices have wheels, are power operated and have considerable weight. As a result, they are not suitable for aerating around bushes, in gardens and in other areas wherein there is insufficient space to maneuver large pieces of equipment.

Several single punch, manually operated aerators have also been developed, however they do not utilize any form of mechanical advantage and are therefore not too valuable when the turf is extremely hard. To overcome the problem wherein only arm power is used to accomplish the punching operation, a foot element is secured to a handle thereby allowing the operator to step on the element thus forcing a tool into the ground. However a review of these aerators fails to reveal any method of utilizing kinetic energy to accomplish the coring or punching operation.

SUMMARY OF THE INVENTION

The lawn aerator of this invention utilizes a coring tool removably secured to a rod, a hollow guide tube, an inner hollow tube telescopically mounted in the guide tube and axially receiving the rod, a weight disposed in the upper end of the guide tube and a spring disposed in the guide tube and interconnecting the rod and the upper end of the inner tube, wherein the tool is biased to a position disposed within the guide tube. Actuation of the guide tube, from a position wherein the weight is distal the upper end of the rod to a position wherein the weight is driven against the rod, permits the kinetic energy of the weight to drive the rod downwardly in the inner tube and the tool outwardly of the inner tube, and into what ever surface the inner tube lower end is disposed against.

It is an object of this invention to provide a lawn aeration device wherein kinetic energy of a moving weight is utilized to punch a core in the surface of a lawn.

Another object of the aerator device of this invention is the provision of a self extracting device which removes the tool from the ground after the core has been punched.

Still another object is to provide an aerator which will permit the tool to be inserted into and removed from the ground by the performance of only one action on the device.

A further object of this invention is the provision of an aerator device which efficiently removes a turf core from the ground.

An additional object of the invention is to provide a turf perforating tool which may be easily removed and replaced in the event the tool should be damaged.

Still another object of the invention is to provide an effective turf perforating tool that is simple of construction and operation, and extremely economical to manufacture.

These objects and other features and advantages of this invention become more readily apparent upon reference to the following description when taken in conjunction with the appended drawings.

BRIEF DESCRIPTION OF THE DRAWINGS

In the drawings, although various modifications and alternate constructions can be made thereto without departing from the true spirit and scope of the invention, a preferred embodiment of the invention is illustrated, wherein.

DETAILED DESCRIPTION OF THE PREFERRED EMBODIMENT

Figure 1:
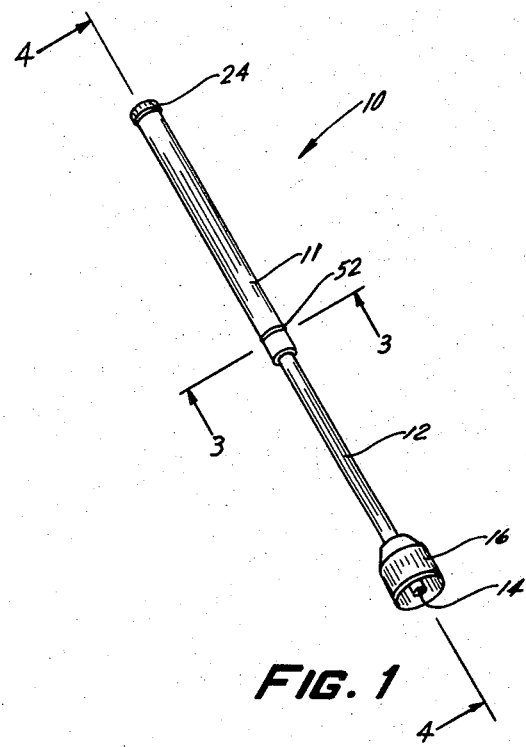
FIG. 1 is a perspective view of the aerator device of this invention.
Figure 4:
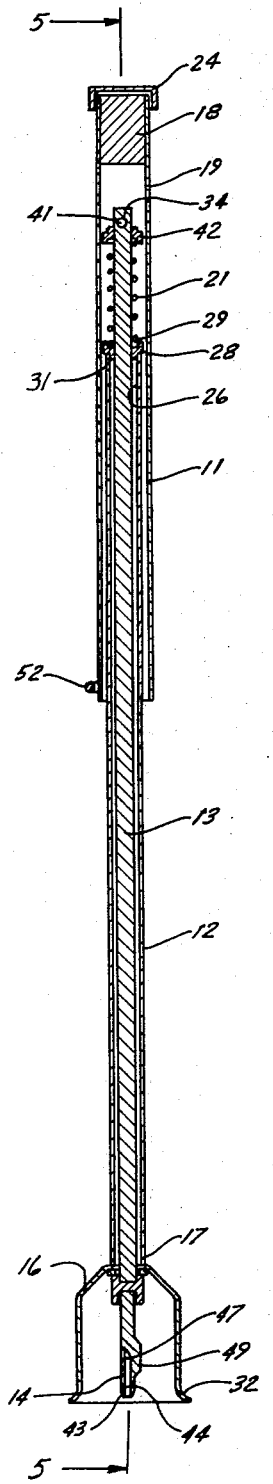
FIG. 4 is a sectional view taken along the lines 4 — 4 in FIG. 1.

Turning now to FIGS. 1 and 4 of the drawings, the aerator device of this invention is indicated generally at 10. The device comprises a guide tube 11, a hollow inner tube 12 telescopically mounted in the guide tube 11, a rod 13 (FIG. 4) axially disposed in the inner tube 12, a tool 14 removably secured to the rod 13, a bell housing 16 secured to the bottom end 17 of the inner tube, a weight 18 mounted in the upper end 19 of the guide tube 11, and a spring 21 interconnecting the inner tube 12 and the rod 13.

Figure 3:
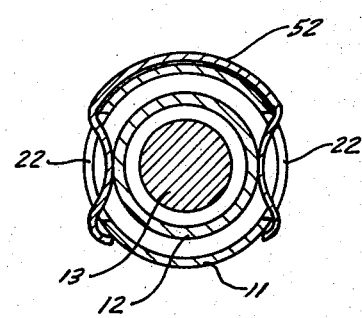
FIG. 3 is a sectional view taken along the lines 3 — 3 in FIG. 1.

The guide tube 11 (FIGS. 3 and 5) is formed from a hollow tube and has a pair of diametrically opposed circumerentially extending slots 22 formed in the lower end 23 thereof. The weight 18 is secured in the upper end 19 thereof and projects downwardly a short distance inside the tube. Disposed over the upper end 19 of the guide tube 11 is a plastic cap 24 or the like to cover any sharp edges of the tube upper end 19.

Figure 6:
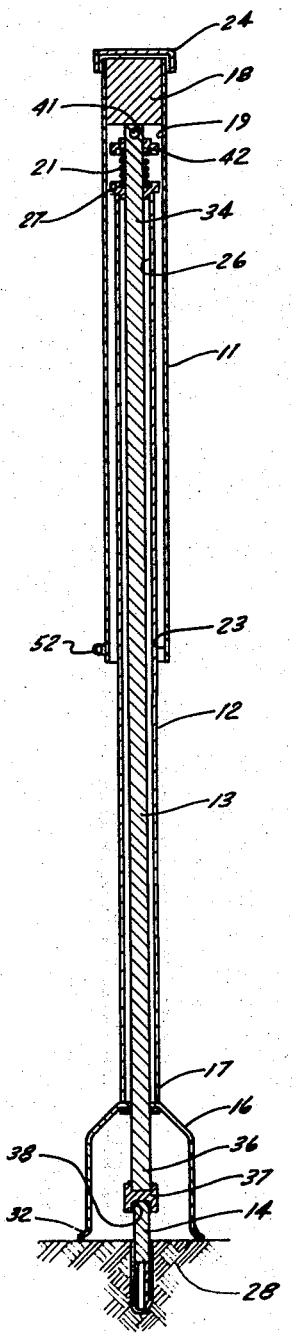
FIG. 6 is a view similar to FIG. 4 wherein the tool projects outwardly as it would in operation.

Telescopically mounted in the guide tube 11 is the inner tube 12 (FIGS. 3 and 4) having a top end 26 and the bottom end 17. The upper end is always disposed in the guide tube 11, however the bottom end 17 always projects axially thereof. A nylon annular plug 27, or the like, is disposed in the end 26 and has the upper end 28 thereof reamed out to provide a seat 29 for the spring and has the lower end 31 thereof turned down to permit the lower end 31 to seat in the inner tube top end 26. Secured to and projecting axially of the inner tube bottom end 17 is the bell housing 16. The base end 32 of the housing 16 is flanged outwardly and is adapted to rest on the ground 33 as shown in FIG. 6.

Colinear with and slidably mounted in the inner tube 12 (FIGS. 5 and 6) is the rod 13. The rod upper end 34 projects upwardly of the inner tube top end 26 and the lower end 36 projects downwardly of the inner tube bottom end 17.

Secured, as by welding, to the rod lower end 36 is a tool connector 37 which has a tapped hole 38 formed axially therein from the bottom end. A hole 39 is drilled radially through the rod upper end 34 and disposed therein is a pin 41. A second nylon annular plug 42 is disposed over the rod upper end 34 and below the pin 41. The second nylon plug 42 is identical to the nylon plug 27 however it is inverted with the reamed end projecting downwardly, and the turned end projecting upwardly and seated against the pin 41. Disposed over the rod upper end 34 between the two plugs 27 and 42 is the spring 21, with ends of the spring 21 seated in the reamed ends of the plugs 27 and 42.

The two plugs have internal diameters substantially equal to the outer diameter of the rod. The first plug 27 serves as a bearing to guide the rod in the inner tube. The outer diameters of the two plugs 27 and 42 serve as bearings to guide the inner tube 12 and the rod 13, respectively, in the outer tube 11.

Figure 2:
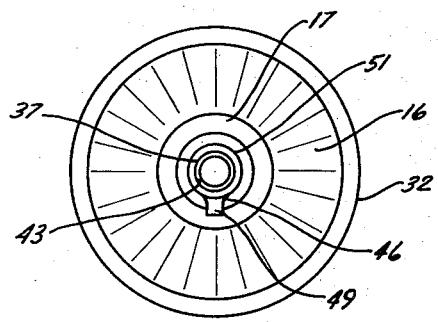
FIG. 2 is an enlarged bottom end plan view thereof.

Threadably mounted in the tool connector 37 (FIGS. 4 and 5) is the tool 14. The tool is generally cylindrical in shape and has an external circumferential bevel 43 formed on the lower end thereof. An axial bore 44 extends upwardly from the lower end of the tool 14 a distance approximately equivalent to one third of the length of the tool 14, thence it is inclined upwardly toward the tool trailing edge 46. The inclined section 47 of the bore 44 exits from the tool trailing edge 46. The intersection of the bevel 43 (FIGS. 2 and 4) and the bore 44 provides a cutting edge 48 for the cutting of cores (not shown). A longitudinally U shaped boss 49 is secured to the leading edge 51 of the tool 14 and is integral therewith. The boss 49 is disposed substantially opposite the exit opening of the bore 44 for the purpose of reinforcing the sidewalls of the tool 14, and the two parallel disposed sides of the boss provide wrenching flats for a wrench when the tool is threadably secured to or removed from the connector 37.

To prevent the inner tube 12 from sliding out of the guide tube a U shaped retainer ring 52 (FIGS. 3 and 5) is circumferentially disposed over the guide tube 11 with legs 53 of the ring 52 disposed through the slots 22 and against the inner tube 12. The first nylon plug 27 projects slightly outwardly of the inner tube therefore upon extension of the inner tube 12 the plug 27 will coact with the ring legs 53.

Figure 5:
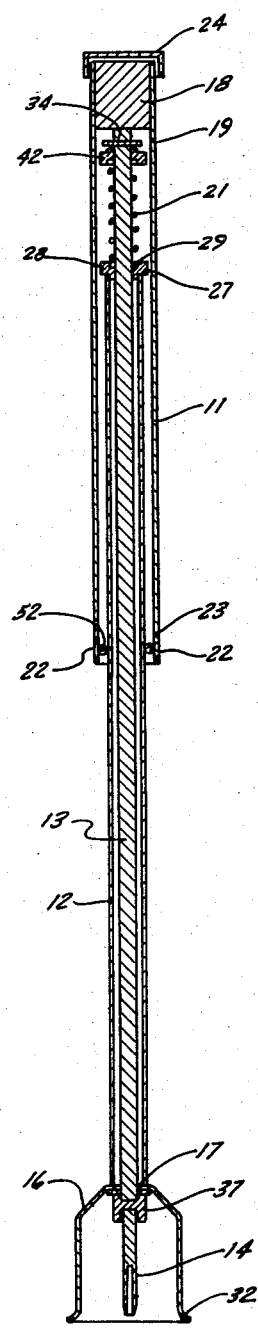
FIG. 5 is a sectional view taken along the lines 5 — 5 in FIG. 4, however the guide tube is disposed in a slightly different position.

In operation the housing flange 32 is disposed against the surface of the ground 28 and the guide rod 11 is grasped and lifted upwardly wherein the weight 18 is separated from the rod upper end 34, as in FIG. 4. It will be noted that the spring 21 biases the rod 13 and thus the tool 14 upwardly to a first position wherein the tool is disposed above the ground surface and in the housing 16. A rapid downward force on the guide tube 11 causes the weight 18 to contact the rod upper end 34 as shown in FIG. 5. Continued downward force, in combination with the kinetic energy of the moving weight, drives the rod downwardly and the tool leaves the housing and enters the ground (FIG. 6). Release of the downward pressure permits the spring 21 to return to its original shape thus pulling the rod 13 and the tool 14 upwardly and the latter returns to its first position within the housing 16. A core of turf will remain in the bore 44 however subsequent operations of the device 10 causes the new cores to push the old cores out through the exit opening of the tool.

In the event a tool becomes dull or non operative it can readily be removed and sharpened or replaced, either by placing the device 10 in a FIG. 6 configuration or by disassembly of the device 10. Disassembly is readily accomplished by removing the retaining ring 52, pulling the inner tube out of the guide rod, and then removing the pin 41, thus permitting the rod, plugs and spring to be removed.

I claim:

1. An aerator device for coring or punching holes in the surface of the ground, said aerator device comprising:
   a guide tube having an open lower end and a plugged upper end;
   an open ended inner tube telescopically mounted in said guide tube and having a top end disposed in said inner tube and a bottom end projecting axially of said guide tube;
   a rod axially and slidably disposed in said inner tube and having an upper end projecting outwardly of said inner tube top end and a lower end projecting outwardly of said inner tube bottom end;
   a tool axially secured to said rod lower end; and
   biasing means interconnected between said rod upper end and said inner tube top end to bias said rod upper end outwardly of said inner tube top end;

wherein upon the application of a downward force on said guide tube from a first position with said plugged end spaced apart from said rod upper end to a second position with said plugged end forcing said rod downwardly in said inner tube against the bias of said biasing means, said rod lower end will be forced from a first position disposed proximate said inner tube bottom end to a second position disposed outwardly of said first position, and upon release of said force said biasing means will cause said rod to return to said first position.

2. An aerator device as defined in claim 1 including a weight disposed in said guide tube plugged end.

3. An aerator device as defined in claim 2 including an open ended housing secured to said inner tube bottom end and extending axially therefrom, said tool disposed in said housing in said first position and projecting outwardly therefrom in said second position.

4. An aerator device as defined in claim 3 including an annular plug means disposed in said inner tube top end in which said rod upper end slides.

5. An aerator device as defined in claim 4 including a second annular plug mounted on said rod upper end, said second plug having an outer diameter slightly smaller than said guide tube inner surface thus serving as a guide for said rod.

6. An aerator device as defined in claim 5 wherein said biasing means is a helical spring disposed around said rod upper end with its ends seated against said plugs.

7. An aerator device as defined in claim 6 including a stop means interactingly connected between said guide tube and said inner tube to prevent said tubes from becoming disconnected.

8. An aerator device as defined in claim 7 wherein said stop means includes at least one slot formed in said guide tube lower end, a retaining ring detachably mounted over said guide tube lower end with a portion thereof projecting through said slot and against said inner tube, and a projection mounted on said inner tube and coactable with said ring.

9. An aerator device as defined in claim 8 including a cap mounted over said guide tube plugged end.

* * * * *